May 21, 1968

J. DIMEFF ET AL 3,384,820

VIBRATING ELEMENT ELECTROMETER WITH OUTPUT SIGNAL
MAGNIFIED OVER INPUT SIGNAL BY A FUNCTION OF THE
MECHANICAL Q OF THE VIBRATING ELEMENT

Filed May 17, 1965

INVENTORS
JOHN DIMEFF
GRANT W. COON
BY
*G. + McCoy*
*Daniel G. Brekke*
ATTORNEYS

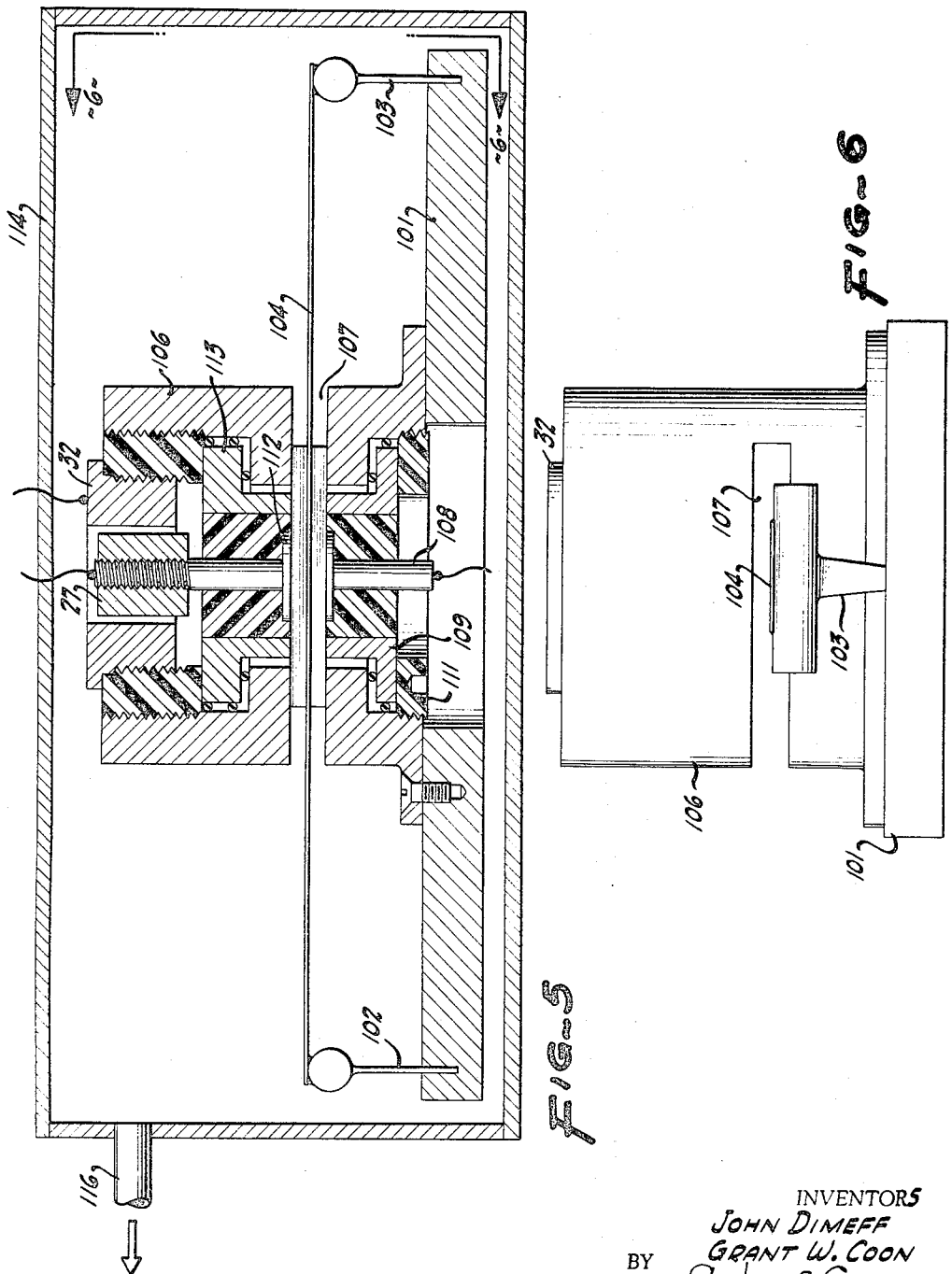

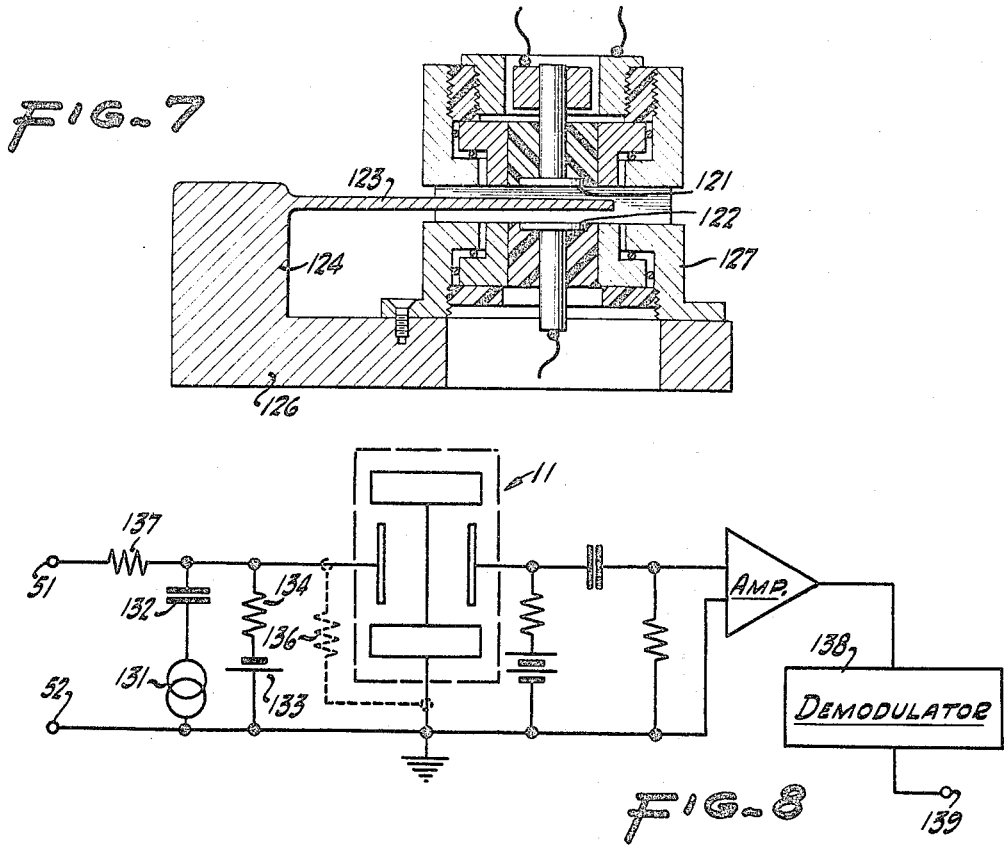
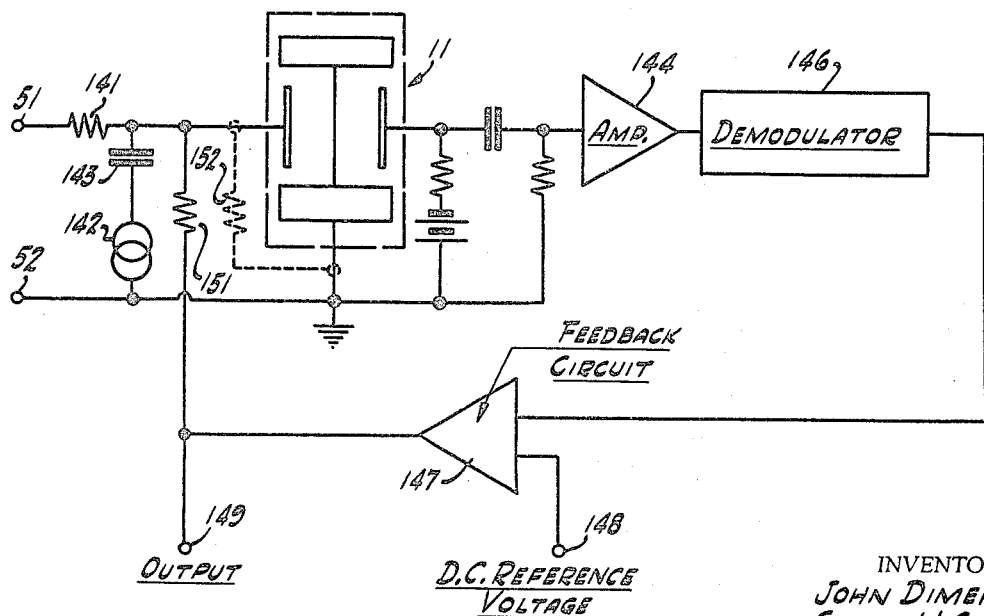

United States Patent Office 3,384,820
Patented May 21, 1968

3,384,820
VIBRATING ELEMENT ELECTROMETER WITH OUTPUT SIGNAL MAGNIFIED OVER INPUT SIGNAL BY A FUNCTION OF THE MECHANICAL Q OF THE VIBRATING ELEMENT
John Dimeff, San Jose, and Grant W. Coon, Palo Alto, Calif., assignors to the United States of America as represented by the Administrator of the National Aeronautics and Space Administration
Filed May 17, 1965, Ser. No. 456,581
14 Claims. (Cl. 324—120)

ABSTRACT OF THE DISCLOSURE

A vibrating element electrometer comprising a vibratory element disposed between fixed forcing and detecting plates. The vibrating element is electrostatically driven by a voltage containing (1) an alternating voltage at the resonant frequency of the element and in quadrature with the element's displacement, and (2) the DC input voltage. With such an input applied to the forcing plate, the vibratory element vibrates at its resonant frequency. The motion of the vibrating element is magnified by the mechanical Q of the element, whereby the output signal, at the detecting plate also is magnified over the DC input by a fraction of the mechanical Q of the vibratory element to provide the arrangement with high conversion gain.

---

The invention described herein may be manufactured and used by and for the United States of America for governmental purposes without the payment of any royalties thereon or therefor.

The present invention relates to an improved electrometer employing a vibrating membrane and produces a particularly high conversion gain by the utilization of particular circuitry in which the electrometer input current controls the displacement amplitude of the vibrating member, which is forced to vibrate at its resonant frequency.

The majority of known electrometers may be generally classified as mechanical electrometers, vaccum tube electrometers, and dynamic capacitor electrometers. The vibrating element electrometer of the present invention may be considered as falling within both the mechanical and dynamic capacitor classifications. With regard to the vibrating element transducer of the present invention, reference is made to the copending prior patent application Ser. No. 231,046, now abandoned, entitled "Dynamic Sensor" and filed in the U.S. Patent Office on Oct. 16, 1962, generally showing a transducer suitable for use in the present invention. In general, the foregoing transducer includes closely-spaced forcing plate, membrane and detecting plate, with the intermediate membrane being adapted to vibrate at resonant frequency thereof between the forcing plate and detecting plate by the application to the forcing plate of an alternating current voltage of appropriate frequency. This transducer, which was also described in "Review of Scientific Instruments," 33,804 (1962), may be utilized as a conventional dynamic capacitor electrometer, as suggested in the cited article. For such an application of the transducer, forcing voltages would normally be applied between the forcing plate and membrane, while the input current lead and output voltage lead would be connected between the detecting plate and membrane. With such an arrangement, a voltage conversion gain of about 0.20 could be expected. The present invention provides a different and highly advantageous electrometer utilizing a vibrating unit, such as the one briefly described above, to obtain a very high conversion gain. In general, the invention employs the electrometer input to produce a component of force, and multiplies the magnitude of this force by a sinusoidally varying voltage of large amplitude. Furthermore, the effect of the foregoing force is herein amplified by the resonant response of a vibrating element such as a membrane having small internal losses. In addition, relatively high voltages are applied to the detecting side of the transducer to provide a direct increase on the magnitude of the output signal proportional to the displacement of the membrane and the bias voltage.

The present invention is illustrated as to a plurality of preferred embodiments thereof in the accompanying drawings, wherein:

FIGURE 5 is a longitudinal sectional view of an alternative embodiment of the invention utilizing a ribbon vibrating member;

FIGURE 6 is a transverse sectional view taken in the plane 6—6 of FIGURE 5;

FIGURE 7 is a sectional view of a further transducer embodiment utilizing a cantilever vibrating member;

FIGURE 8 is a schematic illustration of a further embodiment of the inventon; and FIGURE 9 schematically illustrates an electrometer circuit with feedback.

Figure 1:
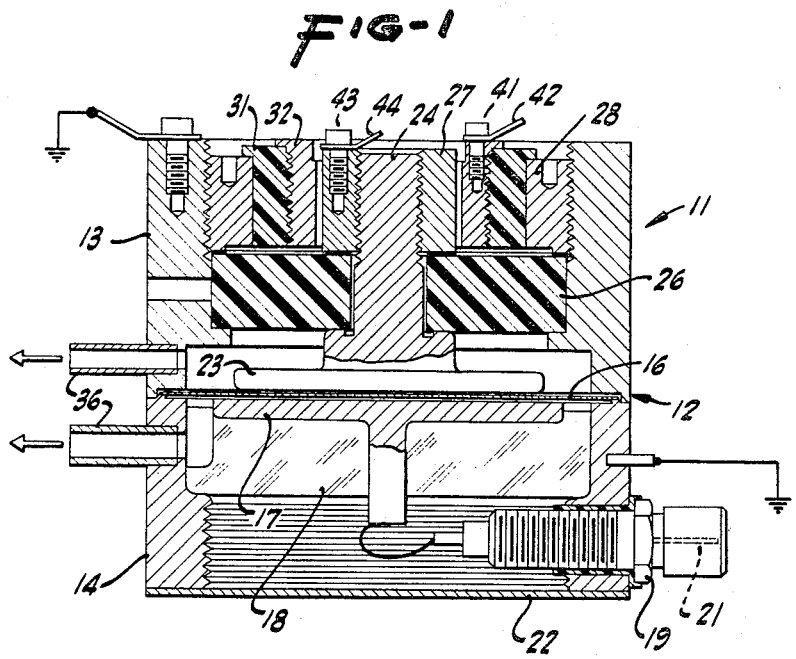
FIGURE 1 is a longitudinal sectional view taken in the central plane through the transducer of the electrometer hereof.

Considering first the physical structure of the transducer 11 illustrated in FIGURE 1, there will be seen to be provided a generally cylindrical housing 12, formed of a metal such as steel, in upper and lower sections 13 and 14. A vibrating element 16, such as a thin, flexible diaphragm is supported between abutting edges of the upper and lower sections of the housing, and divides the housing into two internal portions. The diaphragm is formed of flexible, electrically-conducting material, and has an extremely thin cross-section as, for example, of the order of a few thousands of an inch to a few millionths. Beneath, and in close proximity to the diaphragm 16, there is mounted a metal detecting plate or electrode 17. This detecting plate 17 is carried by an insulator 18 which insulates the detecting plate from the housing while mounting the plate in the housing. A lead-through connection 19 extends laterally through one side of the lower housing section 14 with an electrical conductor extending from the inner end thereof into electrical contact with a depending shank of the detecting plate 17. A detecting plate lead 21 may be considered to be comprised by the electrical conductor extending from the lead-through connection 19. A metal cover plate 22 is attached across the bottom of the lower housing section 14.

Immediately above the central flexible diaphragm 16 within the housing, there is provided a rigid metal forcing plate or electrode 23 having a generally flat surface in close proximity with the opposite side of the diaphragm from the detecting plate 17. The forcing plate 23 has a shank 24 extending therefrom. A large insulating ring 26 is disposed about the forcing plate shank 24 abutting the shoulder on the back of the plate, and a center nut 27 is threaded about the shank 24 to bind the insulating ring against the plate 23. This entire assemblage is maintained in position within the housing by an internal shoulder about the interior of the upper housing section 13 upon which the insulating ring 26 rests. The insulating ring 26 is forced downwardly upon the shoulder in locked position by an outer nut or ring 28 having external threads mating with internal threads about the upper housing section 13. This nut or ring 28 is screwed downwardly into the housing into forcible engagement with the upper surface of the insulating ring 26, thereby to hold the ring against the above-noted internal housing shoulder.

In addition to the foregoing elements of the transducer, there is also provided an annular, internally-threaded insulator 31 with a top external flange and dimensioned to fit tightly within the ring or nut 28 with the flange over the top thereof, as illustrated. An inner metal ring 32 is externally threaded to engage the internal threads of the insulating ring 31, and is also provided with a laterally-extended upper lip fitting over the top of the insulating ring 31, again as illustrated.

Provision is made for maintaining a high degree of vacuum within the transducer housing 12, and this may be accomplished by vacuum pumping means attached to pipes 36 extending through a side wall of the upper and lower housing sections above and below the transverse diaphragm 16. Suitable provision is made for maintaining a high degree of vacuum within the housing, and in this respect there may be employed gaskets, as required, to minimize leakage of air into the housing. For certain applications of the invention, it may be desirable to continuously pump the interior of the housing. In other circumstances, the pipes 36 may be closed off after attainment of the desired internal vacuum in the housing, so as to provide a sealed unit for use under circumstances wherein evacuation means are not readily available.

Electrical connections are provided to particular portions of the transducer, including connection to the detecting plate 17 via the conductor 21. Atop the transducer housing, there is provided a connection 41 to the inner metal ring 32. This connection may be formed by a bolt threaded downwardly into the top of the ring to force a conductor 42 into good electrical contact with the ring. This inner ring 32 is spaced laterally outward of the center nut 27 about the top of the forcing plate shank 24. The space between this inner ring 32 and center nut 27 is very accurately maintained, for these two units and the space therebetween comprise a capacitive coupling, as described in more detail below. An electrical connection 43 is made to this center nut 27 and, consequently, to the forcing plate 23, and may take the form of a bolt threaded downwardly into the nut and pressing a conductor 44 into good electrical contact with the nut. The housing 12 of the transducer is electrically grounded and, preferably, this is accomplished at both the upper and lower sections of the housing in order to insure a good ground connection for the entire housing. These ground connections may be made in a variety of ways, such as those illustrated, for example, in the drawing. Provision is preferably made for maximizing leakage resistance between the connections 41 and 43 in order to assure a large fixed capacitance therebetween. Certain provisions in this respect are illustrated in FIGURE 1.

Figure 2:
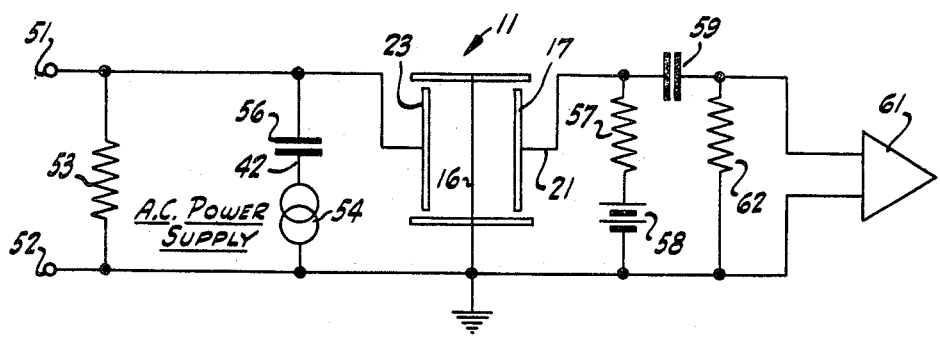
FIGURE 2 is a schematic wiring diagram of the electrometer.

Considering one preferred embodiment of the electrometer circuit of the present invention wherein the full capabilities of the above-described transducer are utilized for maximized conversion gain, reference is made to FIGURE 2 of the drawing. Although it would normally be expected that a transducer of the vibrating membrane type would be directly employed by applying a forcing voltage to the forcing plate and an electrometer input to the detection plate, such application produces a dynamic capacitor electrometer in which the conversion gain is equal to the ratio of the peak change in capacitance to the capacitance between the undisplaced membrane and the protecting plate. In accordance with the present invention, however, the mechanical resonant properties of the vibrating membrane of the transducer are employed to provide a high conversion gain. The diaphragm or membrane is driven by a voltage containing a first component that varies sinusoidally at the resonant frequency of the membrane and is in quadrature with the displacement thereof, and a second component which is a steady voltage produced by a small current to be measured flowing through a resistance connecting the stationary forcing plate and the transducer housing. The circuit, as schematically shown in FIGURE 2, includes electrometer input terminals 51 and 52, of which the second terminal 52 is grounded. A resistor 53 is connected from the electrometer input terminal 51 to ground, and this input terminal 51 is connected by the conductor 44 to the stationary forcing plate 23 of the transducer unit. In addition, an alternating current power source 54 is capacitively coupled to the stationary forcing plate 23 of the transducer, and this capacitance is schematically illustrated at 56 of the figure. It is to be appreciated that the capacitor 56 shown in the wiring diagram is actually comprised of the spaced elements 32 and 27 of the transducer, as shown in FIGURE 1. On the output or measuring side of the transducer, the conductor 21 extends from the detecting plate 17 to one end of a resistor 57 that is connected to ground through a biased voltage supply 58. The detecting plate is also coupled by a capacitor 59 to one side of an indicating and/or amplifying unit 61 having the other input terminal thereof grounded. A resistor 62 is connected across the input terminals of the unit 61.

Considering now the conversion gain of the electrometer illustrated in FIGURE 2, it is first assumed that the membrane or diaphragm 16 is spherically deformed during operation, with small displacement amplitude, and that the radius of the diaphragm equals the radius of the forcing plate. These assumptions are quite proper, inasmuch as they very closely approximate the actual circumstances. For the first vibrational mode of the membrane, with the above assumptions, the work done per cycle is given by the expression:

$$W_e = (\pi^2 \epsilon V_{vi} V_{si} r_0^2 / x_p)(\Delta C/C)$$

where all units are in the mks. system, and $\epsilon$ is the dielectric constant, $V_{vi}$ is the peak value of the sinusoidally varying drive voltage, $V_{si}$ is the steady component of the input voltage, $r_0$ is the radius of the membrane, and $x_p$ is the spacing between the undisplaced membrane and the stationary plates. The work energy defined above is approximately $2\pi$ times the energy stored in the membrane at peak displacement divided by the Q of the system, so that $W_e = 2\pi(W_{max}/Q)$, and if K is defined as the effective spring constant of the system, then $$W_e = \frac{1}{2}(K a_0^2/Q)(2\pi)$$

where $a_0$ is the maximum average displacement of the membrane or diaphragm. Since $\Delta C/C = a_0/x_p$ and $K = 8\pi T$, where T is the tensioning force per unit length of circumference of the diaphragm, the following relationship may be derived from the foregoing equation:

$$W_e = (8\pi^2 T/Q) x_p^2 (\Delta C/C)^2$$

From the first and last relationships set forth above, it may be derived that $V_{si} = (8T x_p^3 / \epsilon V_{vi} Q r_0^2)(\Delta C/C)$. The capacitance change $\Delta C$ resulting from the displacement of the diaphragm can be determined by measuring its effect on a steady voltage $V_{sm}$ impressed between the diaphragm and detecting plate through a large resistance 57. With the assumption that the diameters of the diaphragm and detecting plate are equal, and that the flow of charge to the detecting device is negligible, $V_{vm}$ (the peak value of the displacement voltage) may be determined by the relationship $V_{vm} = (\Delta C/C) V_{sm}$. The voltage conversion gain for the transducer employed in this manner is $G_{vm} = V_{vm}/V_{si}$, and this may then be restated in the following terms:

$$G_{vm} = \epsilon Q V_{sm} V_{vi} r_0^2 / 8 T x_p^3$$

The resonant frequency $f$ of the membrane or diaphragm having $\sigma$ as its mass per unit area is related by $$f = (0.382/r_0)(T/\sigma)^{\frac{1}{2}}$$

Thus, the voltage conversion gain may be defined as $$G_{vm} \approx (\epsilon V_{vi} V_{sm}/55\sigma x_p^3)(Q/f^2)$$

In this form, the quantities determinative of the voltage conversion gain $G_{vm}$ are either known or may be determined. For one particular vibrating membrane-type transducer which has been constructed, the following approximate mechanical and electrical characteristics pertained:

$$\sigma = 0.02 \text{ kg./m.}^2$$
$$x_p = 4 \times 10^{-5} \text{ m.}$$
$$f = 5,000 \text{ c.p.s.}$$
$$Q = 3 \times 10^4$$

With $V_{sm} = 200$ v. and $V_{vi} = 70$ v., the voltage conversion gain is $2 \times 10^3$. The current conversion gain is obtained by simple substitution of the current resistance product for the input and output voltages, and with resistance $57 = 5 \times 10^6$ ohms and resistance $53 = 5 \times 10^{15}$ ohms, there results a current conversion gain of $2 \times 10^{12}$. The power conversion gain of this illustrative example of the electrometer of the present invention is the product of the voltage and current conversion gains, or, in this instance $4 \times 10^{15}$. Conventional dynamic capacitor electrometers or electrometer tubes normally have a power conversion gain of the order of $10^7$. Thus it will be seen that the present invention provides a very substantial increase in power conversion gain over conventional electrometers.

In addition to power conversion gain, electrometers are also compared upon other bases such as, for example, the sensitivity thereof to charges. The present invention provides a charge sensitivity which is comparable in magnitude to that of a conventional dynamic capacitor electrometer, and the invention is thus sensitive to charges smaller than $6 \times 10^{-16}$ C. A further parameter of electrometers considered to be important in evaluating the performance thereof, is the respective response times. The present invention requires consideration of both mechanical time constant and electrical time constant in determining the response time, and reasonable parameter values provide a time constant of the order of one second. Conventional feedback techniques may be employed to reduce this time constant.

One particular model of the vibrating membrane electrometer of the present invention, as generally described above, was determined to have an input impedance in excess of $10^{16}$ ohms, and to be sensitive to voltages of less than one millivolt impressed on the forcing plate from a low impedance source. The corresponding current sensitivity of the instrument then was $10^{-19}$ A, or approximately one electron per second. Additionally, the electrometer exhibited an extremely low internal power consumption of the order of $4 \times 10^{-4}$ mw.

Figure 3:
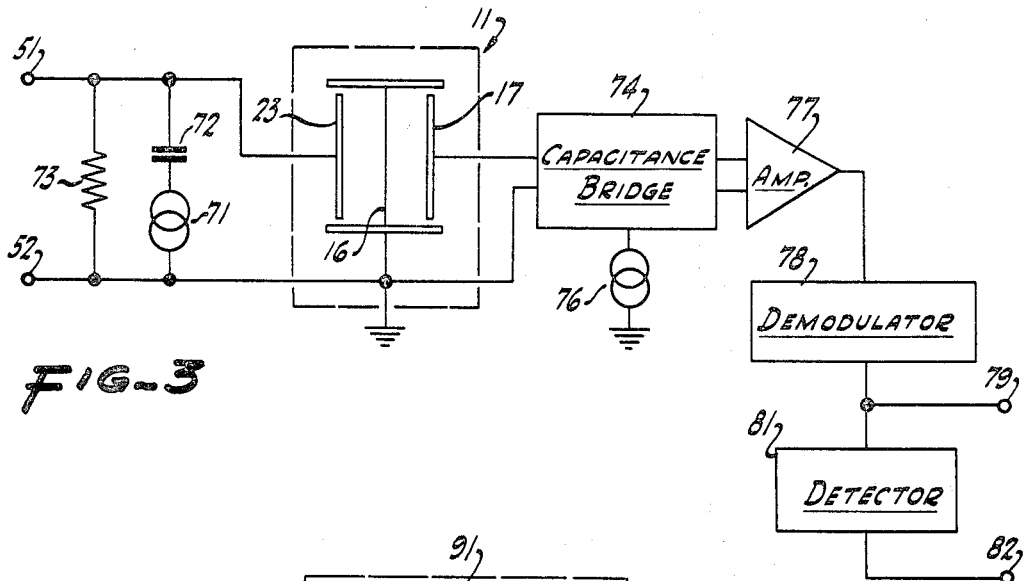
FIGURE 3 is a schematic wiring diagram of the electrometer employing a capacitance bridge and carrier amplifier for detection.

Various modifications of the present invention are possible both in connection with the vibratory transducer and the detecting circuitry. Certain of these variations and alternatives are illustrated in additional figures of the drawings, and reference is made to FIGURE 3 illustrating an alternative detecting circuit. A transducer 11, as previously described, is illustrated to be energized by an alternating current power supply 71 operating in the audio frequency range, for example, at the resonant frequency of the vibratory element 16 of the transducer. This power supply is connected in series with a capacitor 72 between the diaphragm and driving plate 23 of the transducer. Input terminals 51 and 52 are adapted to receive a small DC input current to be measured, and a resistor 73 across these terminals thus superimposes a small input DC voltage upon the AC energization of the transducer. The detecting plate 17 of the transducer is connected to the input of a capacitance bridge 74 having another input thereof grounded, and a carrier frequency source 76 is also connected to this capacitance bridge, so as to produce an amplitude-modulated carrier frequency envelope at the output thereof. The amplitude modulation is proportional to the direct current voltage generated across the input resistor 73. A carrier frequency amplifier 77 is connected to the output of the capacitance bridge 74, and feeds a demodulator circuit 78, which then produces at an output terminal 79 an audio frequency signal having an amplitude proportional to displacement of the diaphragm 16. This signal at terminal 79 may be converted to a direct current signal by a detector 81 including a rectifier and filter, so as to operate a direct current meter, for example, from a DC output terminal 82.

In the circuit of FIGURE 3, a carrier frequency of the order of 100 kilocycles may be employed, and the amplifier 77 is preferably designed to amplify a small passband around 100 kilocycles, so as to materially improve the signal-to-noise ratio of the electrometer circuit. With the natural frequency of the diaphragm 16 being 4,000 cycles per second, for example, the generator 71 thus energizes the transducer at this frequency, so the output of the capacitance bridge 74 would be a 100 kilocycle signal in a 4,000 cycle envelope with the amplitude thereof modulated in accordance with the input DC signal. Demodulation of the amplified signal from amplifier 77 then produces the 4,000 cycle AC signal again at the terminal 79 and the detector 81 produces a DC output voltage from this 4,000 cycle signal, so that direct current measuring means at the terminal 82 will indicate amplitude variations thereof.

Figure 4:
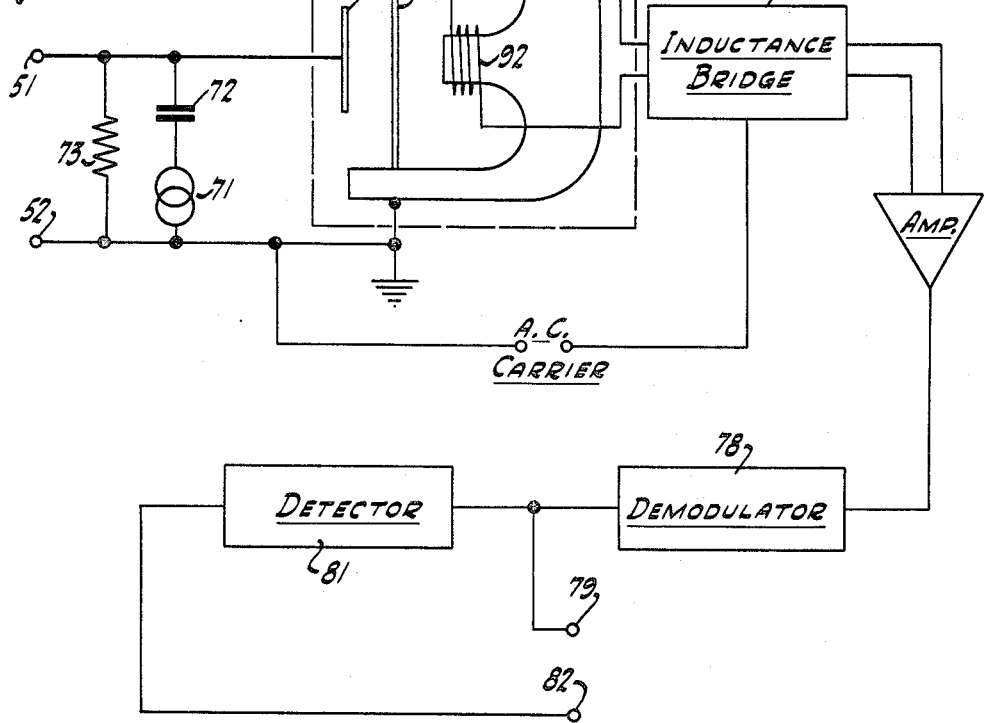
FIGURE 4 is a diagram similar to that of FIGURE 3, but employing an inductance bridge and carrier system.

The embodiment of FIGURE 4 is quite similar to that of FIGURE 3, with the exception that a variation of inductance is employed, rather than a variation of capacitance. The input portion of the electrometer of FIGURE 4 is the same as that of FIGURE 3. However, the transducer varies somewhat in that a magnet 91 is provided with winding 92 upon a central leg thereof adjacent a vibratory member or element 93. As previously described, a driving plate 23 vibrates the element 93 at its resonant frequency, and in this instance it will be seen that the element is mounted at one end thereof upon one leg of the magnet 91, and has the other end unconnected but adjacent an opposite leg of the magnet. With the vibrating element 93 formed of a magnetic material, preferably ferromagnetic, movement of the element will thus vary inductance of the coil 92 which is illustrated to be connected to an inductance bridge 94. In common with the circuit of FIGURE 3, this inductance bridge is also energized by an alternating current carrier signal to thus produce an output that is amplified and demodulated. The demodulated alternating current signal at terminal 79 is identical to that of FIGURE 3, and may be further operated upon by the detector 81 to produce a DC voltage at a second output terminal 82. In all respects other than those described above, the electrometer is the same as that of FIGURE 3.

In addition to the utilization of a vibrating diaphragm, the present invention may employ alternative types of vibratory elements. One advantageous type of vibrating element is a tensioned metallic ribbon. FIGURES 5 and 6 illustrate one preferred mechanical configuration of a transducer in accordance with this invention employing such a ribbon. Referring to these figures, it will be seen that a base plate 101 carries a pair of spaced standards 102 and 103, and a very thin metal ribbon 104 is stretched between the top of these standards over the base with the ribbon ends secured to the tops of the standards. The ribbon may be attached to the standards by welding, and the standards themselves may be either rigid or limitedly flexible. The driving plate and detecting plate of the transducer are mounted in a block 106 secured upon the top of the base 101 and having a lateral slot 107 therethrough for passage of the ribbon, as shown. A detecting plate or read-out electrode 108 is shown to be mounted immediately beneath the ribbon in close proximity thereto, in the block 106. This mounting may be made in the same manner as illustrated in FIGURE 1, or the electrode and depending shank may be embedded in plastic or glass, forming the center of an annular metal mount 109, held in place by a threaded ring 111, and if desired, the mount may be spaced from the block by O-rings, or the like. A forcing plate 112 is disposed immediately above the ribbon, in alignment with the detecting plate 108, and this forcing plate may be mounted and energized in the same manner as illustrated in FIGURE 1. As shown in FIGURE 5, the forcing plate 112 is actually embedded in a mount 113 having a central glass portion and an annular metal portion sealed together. The input capacitance to the forcing plate is formed between the annular ring 32 and the nut 27, threaded on the shank of the forcing plate.

With regard to the ribbon itself, the spacing between the ribbon and detecting plate and forcing plate should be quite small, as of the order of one to five-thousandths of an inch. The ribbon 104 is electrically grounded at the supports 102 and 103. If the ribbon is too short, it becomes extremely stiff, and thus requires a higher frequency and more power to vibrate the ribbon. A greater sensitivity results from elongating the ribbon to reduce the stiffness thereof. However, the extent of the elongation is limited by the allowable mass of the ribbon. A ribbon such as that illustrated in FIGURES 5 and 6 has a very high mechanical Q, so it is thus possible to attain a high degree of mechanical amplification. Application of alternating current energization from circuits such as illustrated in FIGURES 1 and 3, does not deflect the ribbon; however, the application of a direct current input voltage does produce a vibration of the ribbon, and the amplitude of this vibration is proportional to the direct current input voltage multiplied by the Q of the vibrating ribbon. The transducer of FIGURE 5 is maintained in a vacuum, as is the transducer of FIGURE 1, and this is schematically illustrated in FIGURES 5 and 6 by an enclosure 114 and vacuum pipe 116 extending therefrom.

FIGURE 7 schematically illustrates a cantilever beam transducer which is generally similar to the transducer embodiment described above, in that a driving plate and detector plate 121 and 122, respectively, are mounted in close proximity with a vibrating element 123 disposed therebetween. Physical mounting of the forcing plate and detector plate may be accomplished in any desired manner, and again, an input circuit such as that described in connection with FIGURES 1 and 2 may be employed for applying to the forcing plate 122 an alternating current voltage having the same frequency as the resonant frequency of the vibratory member. In the present instance this member or element 123 is formed as a cantilever beam of very thin cross-section extending between the two plates of the transducer, and adapted to be vibrated by the application of small direct current voltages superimposed upon an alternating current voltage having the resonant frequency of the element. No attempt is made in FIGURE 7 to again illustrate all of the mounting elements for the forcing plate and detecting plate. However, one manner of mounting the cantilevered vibratory element 123 is illustrated. This element 123 may extend from an upstanding portion 124 of a base member 126 upon which there is mounted a block, or the like 127, carrying the forcing plate and detector plate. Of course, this transducer is also operated in a vacuum, as by disposing it within an evacuated housing.

In each of the above-described embodiments of the present invention, the vibratory element remains at rest until there is applied a direct current input voltage, which then causes the element to vibrate at its resonant frequency. It is possible also, in accordance with the present invention, to energize the transducer for continuous vibration of the vibratory element and to vary the amplitude of vibration in accordance with an input signal. In FIGURE 8 there is illustrated an electrometer circuit which includes, in addition to an alternating current generator 131 and capacitor 132, a small bias voltage source 133 connected in series with a resistor 134 between the forcing plate and vibratory element secured to the housing. This small bias voltage then causes the vibratory element to move slightly in the absence of an input signal at the terminals 51 and 52. In this manner it is possible to take full advantage of the high Q of the membrane or ribbon forming the vibratory element, and in order to accurately measure the subsequent input voltage, it is necessary for this bias voltage 133 to be a standard fixed voltage of known value. The value of the resistor 134 is made very high, as of the order of $10^{10}$ ohms, so that the impedance of this reference voltage is maintained at a high value. In this circuit, there is also illustrated a leakage resistance 136 which actually appears in all of these circuits, and which comprises the leakage resistance of the insulators in the input end of the transducer. This resistance must, of course, be maintained as high as possible. In this circuit the input resistor 137 is illustrated as being connected in series between the input terminal 51 and the forcing plate of the transducer. The detecting or output portion of the electrometer circuit of FIGURE 8 will be seen to be the same as the circuit of FIGURE 2, with the addition of a demodulator 138 connected to the output of the amplifier and producing a direct current voltage at an output terminal 139. As previously stated, the continual movement of the vibratory member, even in the absence of an input signal, provides for full advantage from the high Q of the vibratory element. It is noted that the term Q is herein employed as being proportional to the resonant frequency times the maximum energy stored divided by the power loss of the element.

It is also possible in accordance with the present invention to employ a feedback system, and in FIGURE 9 there is illustrated such a circuit. By feeding back a portion of the output signal, it is possible to maintain the vibratory element in a state of vibration, so as to attain the advantages of the embodiment of FIGURE 8, and at the same time preclude overly large displacements of the vibratory element. As shown in FIGURE 9, the input terminals 51 and 52 are connected to the transducer 11 with a high resistance 141 inserted in the lead between the terminal 51 and the forcing plate of the transducer. An alternating current generator 142 is connected in series with a capacitor 143 between the driving plate and vibratory element of the transducer. In this instance, as in others described above, the vibratory element is electrically connected to the housing which is, in turn, grounded. The detecting circuit of the electrometer shown in FIGURE 9 is the same as that illustrated in FIGURE 2, with the alternating current amplifier 144 having the output thereof connected to a demodulator 146, which may comprise a rectifier and filter for producing a direct current output. A feedback circuit 147 is connected to receive the output of the demodulator 146, and also to receive a small D-C reference voltage from the terminal 148. This reference voltage is comparable to the bias voltage 133 in the embodiment of FIGURE 8. The output of feedback circuit 147 is applied to an output terminal 149 and is also connected through a large feedback resistor 151 to the driving plate of the transducer. In this instance, also, there exists a large leakage resistance 152 within the transducer between the driving plate and vibratory element, and in FIGURE 9 such is illustrated in dashed lines. The output voltage fed back to the input tends to cancel the input voltage, i.e., a negative feedback is employed. However, the small D-C reference voltage at terminal 148 maintains a sufficient direct current voltage on the transducer so that the vibratory element at all times is in a vibrating state to make maximum utilization of the high Q thereof. It is also noted that the sum of the values of resistances 151 and 152 must be large compared to the value of the input resistance 141, in order to prevent application of a voltage from the electrometer back into the circuit to which it is connected. In actuality, the input resistor 141 is also quite large, but is small compared to the parallel resistance of resistors 151 and 152. It will be further appreciated that with the series input resistor, rather than parallel input resistor, the output of the circuit is proportional to the input current, rather than input voltage.

The electrometer circuit of FIGURE 9 may, of course, be employed with various types of vibratory elements, and it will be seen that the amplitude of vibration of the element is maintained substantially constant through the utilization of the negative feedback arrangement. It is, of course, possible to employ this feedback arrangement with previously described electrometer detector circuits, such as the one of FIGURE 3. Although the utilization of feedback does not increase the sensitivity of the device particularly, it does materially extend the range of the electrometer as it prevents overly large deflections of the vibratory element with the application of larger input signals.

There has been described above a new and improved electrometer, and there is included in this description the illustration and explanation of various embodiments thereof. It is not intended to limit the present invention by the specific terms of the foregoing description, nor by the details of the drawings. Reference is made instead to the appended claims for a precise delineation of the true scope of this invention.

What is claimed is:

1. An improved electrometer comprising a fixed electrode, a vibratory element disposed in close proximity with the fixed electrode, power supply means capacitively coupled between said electrode and said vibratory element and applying a voltage therebetween varying at the resonant frequency of said vibratory element, input terminals applying a direct current input signal between said electrode and said vibratory element, said direct current input signal and varying voltage combining to provide a component of drive for vibrating the element at the resonant frequency thereof with an amplitude proportional to the amplitude of the input signal, pickup means adjacent said vibratory element and producing a voltage proportional to the amplitude of vibrations and amplifying same, and output terminals coupled to said pickup means whereat there is developed a voltage proportional to input signals and the mechanical Q of the vibratory element.

2. An electrometer as set forth in claim 1, further defined by said pickup means comprising a detecting plate disposed adjacent said vibratory element, a high voltage source connected in series with a resistor between said detecting plate and vibratory element, and an alternating current amplifier coupled across said resistor and voltage source, said output terminals being connected to the output of said amplifier.

3. An electrometer as set forth in claim 2, further defined by said high voltage source comprising a carrier frequency source, said amplifier comprising a bandpass carrier-frequency amplifier, and a demodulator connected between said amplifier output and said output terminals.

4. An electrometer as set forth in claim 1, further defined by a direct current standard-voltage bias source connected in series with a large resistor between said fixed electrode and said vibratory element for maintaining said vibratory element in constant resonant vibration.

5. An electrometer as set forth in claim 4, further defined by a rectifier and filter connected to the output of said pickup means, and a feedback circuit connected from said rectifier and filter to said output terminal and to said bias source.

6. An electrometer comprising a transducer including a fixed plate electrode, an electrically conducting vibratory element mounted in close proximity with said fixed electrode, pickup means mounted adjacent said vibratory element, and an evacuated housing about said fixed electrode, vibratory element and pickup means; input terminals; an alternating current power supply producing a voltage varying at the resonant frequency of said vibratory element; a capacitor connected in series with said power supply between said fixed electrode and said vibratory element; a resistor connected between said input terminals and across said capacitor and power supply for applying a direct current voltage to said transducer, said direct current voltage and varying voltage combining to provide a component of drive for vibrating the vibratory element thereof at the resonant frequency of the element and at an amplitude proportional to the amplitude of the direct current voltage; detection circuitry including a power supply and means coupling the power supply to the pickup means for producing an alternating current voltage proportional to the vibrational amplitude of the vibratory element, an alternating current amplifier amplifying said alternating current voltage; and output terminals coupled to said alternating current amplifier.

7. An electrometer as set forth in claim 6, further defined by said vibratory element comprising a thin metallic membrane peripherally mounted in close proximity with said fixed electrode.

8. An electrometer as set forth in claim 6, further defined by said vibratory element comprising a tensioned metallic ribbon mounted at opposite ends to extend across said fixed electrode.

9. An electrometer as set forth in claim 6, further defined by said pickup means comprising a magnet having a pair of legs adjacent the spaced portions of the vibratory element and a central leg adjacent the vibratory element on the opposite side thereof from said fixed electrode, and a winding on said central leg generating a voltage having an amplitude proportional to the amplitude of vibratory element deflections.

10. An electrometer as set forth in claim 6, further defined by said vibratory element comprising a resilient metal cantilever beam of thin cross-section extending over said fixed electrode in close proximity thereto.

11. An improved electrometer comprising a first electrode having a substantially planar face, a second electrode having a substantially planar face spaced from the first electrode, an electrically conducting vibrating element disposed between the first electrode and the second electrode, an input terminal coupled between said first electrode and said vibratory electrode, a source of alternating current voltage capacitively coupled between said element and said first electrode and applying a voltage with a frequency of the resonant frequency of the membrane, a direct current input signal coupled between said element and said first electrode and together with the alternating current voltage providing a drive component for vibrating the membrane at the resonant frequency thereof, a direct current power supply resistively coupled between said second electrode and the vibratory electrode, and output means capacitively coupled to said second electrode.

12. An improved electrometer comprising first and second stationary electrodes having substantially flat facing surfaces closely spaced apart, a vibratory membrane having an extent substantially equal to the flat electrode surfaces and mounted between said surfaces out of contact with each, said membrane being electrically conducting, means maintaining a vacuum between the faces of said electrodes, a source of alternating current voltage coupled between said first electrode and said vibratory membrane and applying thereto a voltage having a frequency equal to the resonant frequency of said membrane, an input terminal adapted to receive electrical charges to be detected, means including a resistor for applying between said first electrode and said vibratory membrane signal voltages proportional to input charges, the combined alternating current voltage and signal voltages at said first electrode serving to vibrate the membrane at its resonant frequency and at an amplitude in accordance with the amplitude of the applied signal voltages, and detecting means connected between the second electrode and the vibratory membrane for indicating input charges.

13. An electrometer as set forth in claim 12, further defined by said detecting means comprising an alternating current amplifier, a high-volage direct current power supply having a first side thereof connected to said membrane and to an amplifier input, a resistor connecting the other side of said power supply to said second electrode, a capacitor coupling said second electrode to another amplifier input, and a resistor connected directly across the inputs of said amplifier.

14. An improved electrometer comprising a transducer having stationary spaced forcing and detecting plates with a vibratory membrane therebetween, an alternating current power supply capacitively coupled between the forcing plate and membrane of said transducer, direct current input terminals connected across a resistor between the forcing plate and membrane of said transducer, the combination of the alternating current power supply and direct current input applied between the forcing plate and membrane having a component at the resonant frequency of the membrane for resonantly vibrating said membrane with an amplitude proportional to applied direct current voltage, a direct current power supply resistively coupled between the membrane and detecting plate of said transducer, and detecting means capacitively coupled to the detecting plate of said transducer.

References Cited

UNITED STATES PATENTS

| | | | |
|---|---|---|---|
| 686,206 | 11/1901 | Coleman | 179—108 |
| 2,092,762 | 9/1937 | Kroger | 179—111 |
| 3,195,037 | 7/1965 | Van Nie | 324—109 |

RUDOLPH V. ROLINEC, *Primary Examiner.*

E. F. KARLSEN, *Assistant Examiner.*